UNITED STATES PATENT OFFICE.

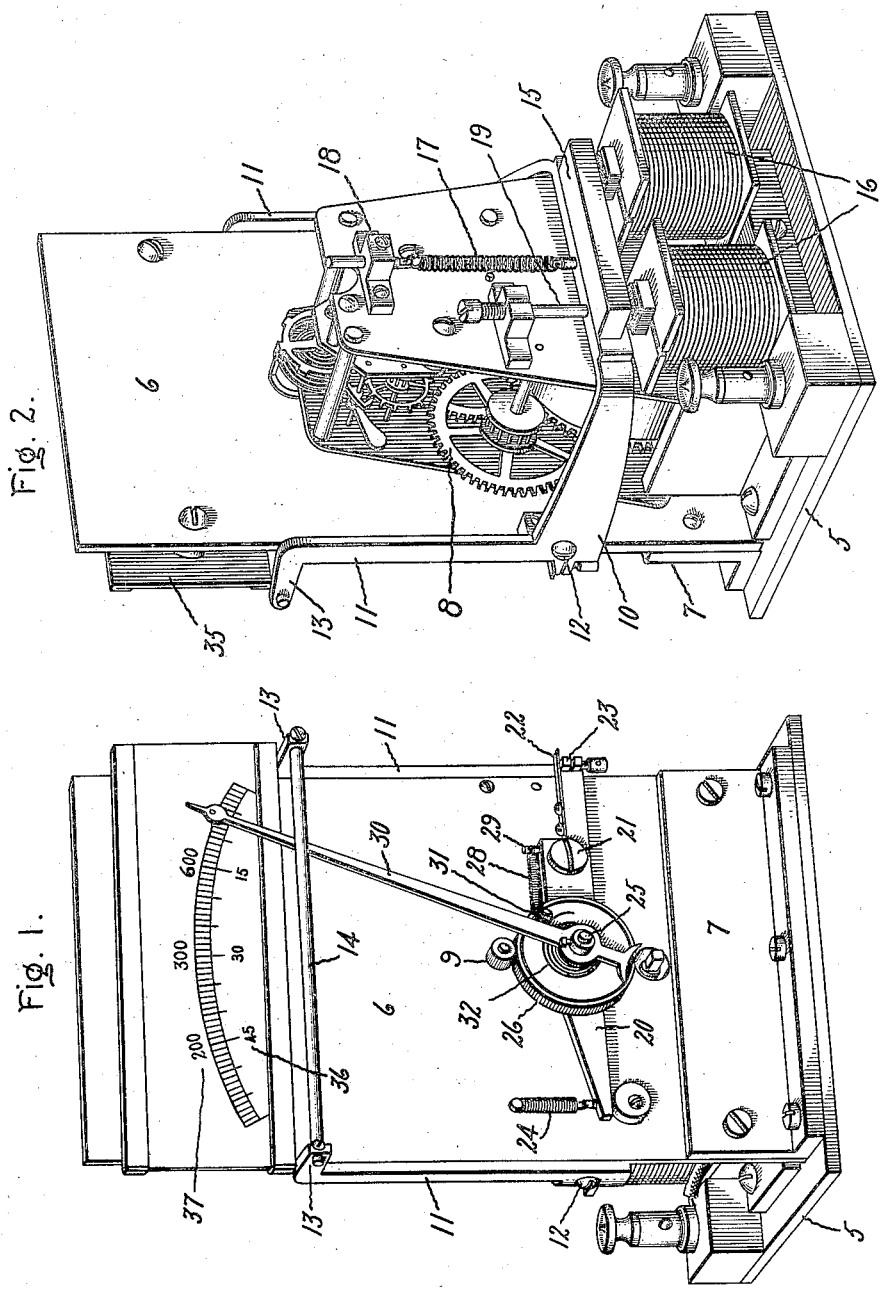

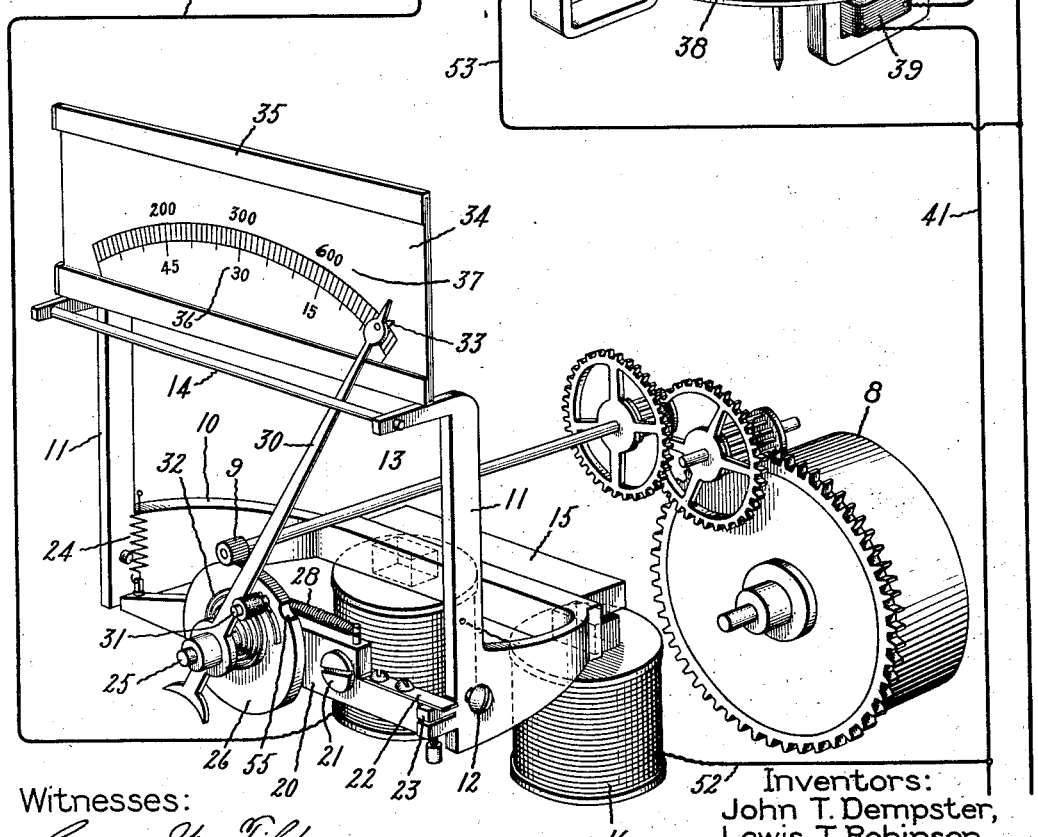

LEWIS T. ROBINSON AND JOHN T. DEMPSTER, OF SCHENECTADY, NEW YORK, ASSIGNORS TO GENERAL ELECTRIC COMPANY, A CORPORATION OF NEW YORK.

DEMAND APPARATUS.

1,139,466.  Specification of Letters Patent.  Patented May 11, 1915.

Application filed March 18, 1913. Serial No. 755,196.

*To all whom it may concern:*

Be it known that we, LEWIS T. ROBINSON, a citizen of the United States, and JOHN T. DEMPSTER, a subject of the King of Great Britain, residing at Schenectady, county of Schenectady, State of New York, have invented certain new and useful Improvements in Demand Apparatus, of which the following is a specification.

Our invention relates to apparatus for recording the character and magnitude of the demand made by an electrical installation upon a central generating station.

More particularly our invention relates to an apparatus for recording the abnormal demands made by an electrical installation with special regard to the frequency of occurrence and the magnitude of abnormally large demands.

A modern problem of major importance in the distribution of electrical energy to individual consumers is to determine the tariff rate which should be charged each consumer for the energy he uses. The most logical method for determining this tariff rate consists in basing the rate upon the character and magnitude of the demand made upon the central generating station by the consumer's installation. This method obviously necessitates the provision of an apparatus which will measure and record the magnitude of the consumer's normal demand, the character of the demand, that is, whether substantially constant or fluctuating, and if fluctuating the frequency of occurrence and the magnitude of the abnormal demands and in particular the abnormally large demands.

A curve drawing instrument gives a substantially complete record of the consumer's demand during the time of the instrument's operation and if properly designed for this particular purpose is the most satisfactory instrument to employ for obtaining the information necessary to determine the proper tariff rate. Since the central station is generally only particularly interested in the abnormally large demands of an electric installation, it is evident that a large portion of the record of the curve drawing instrument could be eliminated or greatly condensed without injuring its utility as a basis for determining the tariff rate.

To this end the object of our invention is to provide an apparatus which can be used in place of the curve drawing instrument for determining the tariff rate and which records in a simple and convenient form the general normal demand and the abnormally large demands made by an electrical installation upon the central station.

One object of our invention is to provide a novel type of demand apparatus adapted to record the demand of an electrical installation in an accurate, satisfactory and convenient form.

Another object of our invention is to provide an apparatus which will give in a compact and convenient form a substantially complete record of the frequency of occurrence and the magnitude of abnormally large demands made by an electrical installation.

A further object of our invention is to provide a novel and improved construction of demand instrument, particularly adapted for carrying out our invention, and also adapted for general use in other types of demand apparatus.

A demand apparatus to be satisfactory to the consumer should err in his favor whenever the apparatus fails to properly function or operate. We have accordingly employed in our novel demand apparatus as the unit of reference a predetermined quantity or interval of metered energy. We have herein employed the expression interval of metered energy to designate a predetermined quantity of energy consumed and metered.

In carrying out our invention, we provide an apparatus for recording on a suitable record sheet the times in which equal quantities of energy are metered. The abnormally large demands will thus be indicated by the abnormally small time intervals in which the equal quantities of energy are metered, and the maximum demand will be indicated by the minimum time in which any one of the equal quantities of energy is metered. It is desirable in most instances to indicate the demand in units of energy instead of, or as well as, units of time and accordingly we provide our apparatus with means for recording the average rate of consumption of energy during each of a number of intervals of time, in each of which a predetermined quantity of energy is metered.

The novel and patentable features which we believe to be characteristic of our invention will be indicated in the claims appended hereto.

The construction and mode of operation of an apparatus embodying our invention will be understood from the following description taken in connection with the accompanying drawings, in which—

Figure 1 is a perspective view of a demand instrument embodying the novel features of our invention; Fig. 2 is another perspective view of the same instrument; Fig. 3 is a diagrammatic view in perspective of our demand apparatus operatively connected to an electrical installation; and Fig. 4 is a view of a detail of construction of the instrument.

As heretofore stated the demand apparatus of our invention is designed to record the times in which equal quantities of energy are metered. The apparatus comprises a novel construction of demand instrument adapted to be used in combination with any design of electric meter of the motor type. Broadly, the demand instrument comprises a time actuated member arranged to measure and record the time in which a predetermined quantity of electrical energy is consumed and metered. At the end of each equal interval of metered energy the time actuated member is arranged to return to an initial or zero position so as to be in readiness to measure and record the time in which the next equal quantity of energy is consumed and metered. The apparatus employs as the unit of reference a predetermined quantity of metered energy. The advantages of this unit have been heretofore intimated and will be hereinafter expatiated. We prefer to speak of these units of reference as equal intervals of metered energy, and this expression is so employed throughout the specification and claims of this application.

Our invention will be best understood by reference to the accompanying drawings. The demand instrument comprises a base 5 to which a vertical supporting member 6 is rigidly secured by means of a bracket 7. A substantially constant speed driving mechanism 8 is arranged on the base 5 and on one side of the supporting member 6 and is adapted to rotate a driving member 9. A driving member 9 is positioned on the opposite side of the supporting member 6 from the mechanism 8 and may consist of a finely toothed pinion, as shown in the drawing, or any other suitable driving means. We have shown a clockwork mechanism as the substantially constant speed driving means, but it will be understood that any other suitable form of driving means, such as a constant speed electric motor, may be employed.

A framework comprising a substantially U-shaped member 10 and vertical arms 11 is pivoted by pins 12 to the sides of the vertical supporting member 6. The upper end of each of the vertical arms 11 is provided with projections 13. To these projections there is secured a rod 14. Near the center of the U-shaped member 10 is rigidly secured the armature 15 of a pair of coöperating electromagnets 16. A coil spring 17 has one end secured to the U-shaped member 10 and its other end secured to a fixed part 18 of the instrument and normally tends to hold the armature at a predetermined distance from the coöperating poles of the electromagnets 16. This predetermined distance is determined by means of the adjustable stop 19.

A lever 20 is fulcrumed on a screw 21 secured to the supporting member 6. One end of the lever is provided with a projection 22 which coöperates with a projection 23 on the pivoted framework. The other end of the lever 20 is provided with a spring 24 which tends to maintain the projections 22 and 23 in contact with each other. The lever 20 carries a short shaft 25 on which is loosely mounted an actuator 26. The actuator 26 is arranged to operatively engage with the driving member 9 and to be rotated by the driving mechanism 8 in a counter-clockwise direction. The actuator is provided with an eccentrically positioned pin 27, as will be clearly seen from Fig. 4 of the drawings, to which is secured one end of a tension spring 28. The other end of the spring 28 is secured to a fixed part 29 on the lever 20. The spring 28 thus tends to return the actuator 26 to an initial or zero position, such position being determined when the pin 27 comes in contact with the lever 20. A movable element 30 is also loosely mounted on the shaft 25 and is adapted to be moved by a pin 31 eccentrically positioned on the actuator 26. It will be observed that a single pin projecting on both sides of the actuator 26 may be employed to perform the functions of the two pins 27 and 31. A control spring 32 is secured at one end to the pin 31 and at the other end to the element 30, and normally tends to maintain the element in engagement with the pin 31 which thus determines the zero or initial position of the element when the actuator 26 is in its zero or initial position. We have shown the movable element 30 in the form of a pointer member, but it will be understood that this showing is merely for the purposes of illustration since the element may assume any desired configuration.

The element 30 is provided with a pin point 33 adapted to sweep across a suitable record sheet 34. Preferably the record sheet is removably positioned in the guides of a frame member 35. The guides are open at one end of the frame member to permit the insertion of the record sheet and are closed at the other end to accurately determine the correct position of the sheet within the frame. The record sheet is provided with a scale 36 of equal graduations which are designed to indicate units of time. Above the scale 36 and adjacent thereto is a second scale 37 which is provided with graduations for indicating the average rate of consumption of energy. The element 30 is positioned between the rod 14 and the record sheet 34 and is constructed of elastic material which tends to maintain it in a normal position and out of contact with the record sheet.

Reference to Fig. 3 of the drawings will explain the electrical connections employed with our demand apparatus. For the purpose of illustration, we have shown the instrument in combination with an induction meter of the well known type. This meter comprises a rotatable disk armature 38 located within the influence of a rotating field produced by the interaction of a series coil 39 and potential coils 40. These coils are properly connected to a main line circuit 41 supplying current to translating devices 42. A shaft 43 is secured to the disk armature 38 and drives, through gearing 44, the usual registering mechanism of the meter which is not shown in the drawings. The shaft 43, also drives a dog 45 which latter in turn drives a gear 46 by means of a pinion 47 and crank arm 48. Rigidly secured to the gear 46 is a metallic contact disk 49 which has three contact fingers 50. A fixed, flexible contact member 51 is operatively positioned in the path of the contact fingers 50.

When any contact finger 50 engages with the coöperating fixed contact member 51 the electric circuit is completed through the windings of the electromagnets 16. For this purpose one terminal of the windings of the electromagnets 16 is connected by conductor 52 to one side of the line circuit 41 and the contact disk 49 is electrically connected by conductor 53 to the other side of the circuit 41, while contact member 51 is connected by conductor 54 to the other terminal of the windings of the electromagnets.

The operation of our demand apparatus is as follows: Under normal conditions the electromagnets 16 are deënergized and the spring 17 holds the armature 15 of the magnets elevated. The driving member 9 is continuously rotated at substantially constant speed by the mechanism 8 and turns the actuator 26 in a counter-clockwise direction. The element 30 is also moved in a counter-clockwise direction by means of the pin 31 mounted on the actuator 26. The element 30 moves at substantially constant speed and sweeps across the record sheet at a uniform rate. We have described the movable element 30 in the specification and claims as time actuated to characterize this normal constant speed movement of the element. The contact fingers 50 are arranged to engage with the contact member 51 at predetermined and equal intervals of metered energy. In the construction illustrated in the drawings a contact finger 50 is designed to engage with the contact member 51 when 150 watt hours of electrical energy have been consumed and metered. When a contact finger 50 engages with the contact member 51, the electromagnets 16 are energized and attract their coöperating armature 15, thereby rocking the pivoted framework. The framework turns through a small angle about its pivot screws 12, and in so turning projection 23 moves projection 22 upward a slight distance and thereby turns lever 20 about its fulcrum 21. The turning of lever 20 interrupts the operative arrangement of the actuator 26 and the driving member 9, and the actuator being now free to move, responds to the influence of its control spring 28 and returns to its initial position. The rocking of the framework causes the rod 14 to press against the element 30 and to force the pin point 33 into the record sheet 34. The rod 14 holds the pin point in the record sheet until the electromagnets 16 are deenergized. Upon the deënergization of the electromagnets, the framework is restored to its normal position by means of the spring 17, and the pin point 33 is withdrawn from the record sheet 34 by the resilient or elastic character of the material of which the element 30 is constructed. As soon as the pin point is withdrawn from the record sheet, element 30 is free to move and under the influence of its control spring 32 returns to its initial position against the stop 31. Simultaneously with the return of the element 30 to its initial position, the lever 20 is turned about its fulcrum by the spring 24 and the driving member 9 again operatively engages with the actuator 26. The cycle of operations is now repeated, and as often as the predetermined quantity of energy has been metered a prick mark is made on the record sheet by the pin point 33 to record the position of the element 30 at the end of the interval of metered energy, and the apparatus is then restored to its initial position. The actuator 26 is provided with a depression 55 in which the driving member 9 can idly rotate without moving the actuator. The function of this depression is to render the apparatus inoperative when the actuator and movable element 30 have turned through the full scale angle in a counter-clockwise direction. If, therefore, the rate of consumption of energy is so small that the actuator is moved through its full operative angle before the predetermined interval of energy is metered, the driving member 9 will merely rotate idly in the depression 55. When the interval of energy has been finally metered, the pin point will impress a prick mark at the extreme left-hand end of the record sheet and the element 30 will then be restored to its initial position in the usual manner. If no energy is being consumed, the actuator will be turned until the depression reaches the driving member, when the latter will rotate idly in the depression.

The record sheet 34 may be made of any suitable material upon which a prick mark can be impressed by the pin point 33. It will obviously be understood that we do not desire to limit ourselves to the particular means of recording herein described and illustrated. We have, accordingly, employed the phrase record sheet in the appended claims to cover any device upon which a record may be made. The record sheet 34 is removably positioned in the guides 35 so that a renewal of the record sheet can be made when desired.

The lower scale 36 of the record sheet reads directly in units of time and this serves to indicate the lengths of time in which equal quantities of energy are metered. Above the scale 36 is the average rate of consumption of energy scale 37. This scale has ascending graduations, reading from left to right, indicating the average rate of energy consumption during each of the equal intervals of metered energy. For example, if the predetermined equal interval of metered energy is 150 watt hours and this quantity is consumed in fifteen minutes, the average rate of consumption of energy during this interval is 600 watts. The prick marks on the record sheet thus serve the double function of indicating the times in which equal quantities of energy are metered, and also the average rate of energy consumption during each of the equal intervals of metered energy.

The prick marks on the record sheet indicate the demand of the electrical installation in a simple and convenient form. In the case of the ordinary installation, the majority of the prick marks will be made on the record sheet at about the same position. This congested portion of the record sheet indicates the magnitude of the normal demand. The prick marks at the right-hand end of the record sheet indicate the abnormally large demands and it is in these demands that the central station is most particularly interested. It will be evident that the maximum demand is indicated by the prick mark nearest the right-hand end of the record sheet. The probability of the equality of abnormal demands is such that there is likely to be few, if any, coincident prick marks at the right-hand end of the record sheet. For this reason it is possible to obtain from the record sheet a substantially correct record of the abnormal demands of the installation, both as to the frequency of occurrence and the magnitude of such demands.

One of the particular advantages of a demand apparatus employing as a unit of reference a predetermined interval of metered energy, resides in the fact that any error occasioned by failure of the apparatus to operate is inherently resolved in favor of the consumer. It will be observed that if the apparatus fails to operate at the end of an equal interval of metered energy, that the element 30 will continue to move across the scale in a counter-clockwise direction, thus indicating a longer length of time for the consumption of the interval of energy. In no case will a failure of the instrument to operate at the end of an energy interval give an indication of a demand which is prejudicial to the consumer. In the case of instruments whose moving element is proportional to the consumption of energy, exactly the reverse is true, and if the instrument fails to operate once, an erroneous record is obtained which greatly prejudices the consumer.

The only circumstances under which an erroneously large demand can be recorded is realized if the driving mechanism stops. Only one erroneous record can then be produced and if the record most prejudicial to the consumer is disregarded he is given the benefit of every doubt. If, therefore, the meter reader finds the driving mechanism stopped the prick mark at the extreme right of the record sheet is disregarded. This may or may not be the record last made, but the consumer is given the benefit of the doubt and accordingly has no reason to complain.

The resolution of all reasonable doubts in favor of the consumer is not unjust to the central station. The failure of any apparatus to properly operate is unlikely to occur frequently, but one such failure imposes a heavy and inequitable penalty upon an individual consumer. On the other hand, the failure to record all maxium peaks against all consumers is not of particularly great consequence to the central station, since the central station is dependent for its revenue on the average record of all such apparatus located in its system of distribution.

The movement of the element 30 in a counter-clockwise direction is a novel feature of the construction of our instrument. The movement of the element in this direction permits the use of a record sheet having graduations of average rate of consumption of energy in ascending relation from left to right. The examination of the record is thereby facilitated since the scale is of the normal and usual type with the abnormally large demands recorded at the right-hand end.

We have described and illustrated herein the preferred embodiment of our invention.

It will be apparent to those skilled in the art that numerous changes may be made in this demand apparatus and various modifications made in the construction of the demand instrument without departing from the spirit of our invention. We have accordingly aimed in the appended claims to cover all modifications which are within the scope of our invention.

What we claim as new and desire to secure by Letters Patent of the United States, is:—

1. A demand apparatus comprising in combination an electric meter, and means coöperating with said meter for recording the average rate of consumption of energy during each of a number of intervals of time in each of which a predetermined quantity of energy is metered.

2. A demand apparatus comprising in combination an electric meter, a record sheet, and means coöperating with said meter for recording on said record sheet the average rate of consumption of energy during each of a number of intervals of time in each of which a predetermined quantity of energy is metered.

3. A demand apparatus comprising in combination an electric meter, a stationary record sheet, and means coöperating with said meter for recording on said record sheet the times in which equal quantities of energy are metered.

4. A demand apparatus comprising in combination an electric meter, a record sheet having graduations to indicate time and coöperating graduations to indicate the average rate of consumption of energy, and means coöperating with said meter for recording on said record sheet the times in which equal quantities of energy are metered.

5. A demand apparatus comprising in combination an electric meter, a record sheet, means coöperating with said meter for recording on said record sheet the times in which equal quantities of energy are metered, and means on said record sheet for directly indicating the average rate of consumption of energy during each of the time intervals in each of which an equal quantity of energy is metered.

6. A demand apparatus comprising in combination an electric meter, a record sheet, a time actuated element operatively related to the record sheet, and means controlled by said meter and actuated at equal intervals of metered energy for recording on said record sheet the position of said element and for returning said element to an initial position after the position of the element has been recorded.

7. A demand apparatus comprising in combination an electric meter, a time actuated element, a record sheet operatively arranged in the path of travel of said element, means for recording the position of said element on said record sheet at equal intervals of metered energy, and means operatively related to said last mentioned means for returning said element to an initial position after the position of the element has been recorded.

8. A demand apparatus comprising in combination an electric meter, a time actuated element having an initial position, and means controlled by said meter for recording the times in which equal quantities of energy are metered and for returning said element to its initial position after each recording of the time of metering of an equal quantity of energy.

9. A demand apparatus comprising in combination an electric meter, an electric circuit, means in operative relation with said meter for effecting a change in the electrical condition of said circuit at equal intervals of metered energy, and time actuated means in operative relation with said electric circuit for recording the time in which each of the equal intervals of energy is metered.

10. A demand apparatus comprising in combination an electric meter having a rotatable shaft, an electric circuit including a contact circuit closer, a time actuated element having an initial position, a suitable record sheet operatively related to said element, current responsive means in said circuit, means actuated by said current responsive means for recording the extent of movement of said element upon said record sheet and for returning said element to its initial position, and means actuated by said rotatable shaft for operating said contact circuit closer at equal intervals of metered energy.

11. A demand apparatus comprising in combination an electric meter, an electric circuit, current responsive means in said circuit, a time actuated element having an initial position, a suitable record sheet operatively related to said element, means actuated by said current responsive means for recording the extent of movement of said element on said record sheet and for returning said element to its initial position after such record has been made, and means controlled by said meter for energizing said current responsive device at equal intervals of metered energy.

12. A demand apparatus comprising in combination a stationary record sheet, a movable element arranged to move across said record sheet, a driving mechanism operating to move said element across said record sheet, means for recording on said record sheet the position of said element, means for actuating said last mentioned means at predetermined intervals, and means whereby the element is returned to an initial position after the position of the element has been recorded.

13. A demand apparatus comprising in combination a record sheet, a movable element arranged to sweep across said record sheet, a driving mechanism operating to move said element across said record sheet in a counter-clockwise direction, means for recording on said record sheet the position of said element, means for actuating said last mentioned means at predetermined intervals, and means for returning said element to an initial position after the position of the element has been recorded.

14. A demand apparatus comprising in combination an electric meter, a record sheet graduated in units of time, the ascending graduations on said record sheet reading from right to left, a time actuated element arranged to sweep across said record sheet in a counter-clockwise direction, means for recording on said record sheet the position of said element, means controlled by said meter for actuating said last mentioned means at equal intervals of metered energy, and means for returning said element to an initial position after the position of the element has been recorded.

15. A demand apparatus comprising in combination an electric meter, a record sheet, a movable element arranged to sweep across said record sheet, a substantially constant speed driving mechanism operating to move said element across said record sheet in a counter-clockwise direction, means for recording on said record sheet the position of said element, means controlled by said meter for actuating said last mentioned means at equal intervals of metered energy, and means for returning said element to an initial position after the position of the element has been recorded.

16. A demand apparatus comprising in combination an electric meter, a movable element having an initial position, means for moving said element at substantially uniform speed, means whereby a record is obtained of the extent of movement of said element from its initial position at the end of the metering of each of a number of equal quantities of electric energy, and means whereby said element is returned to its initial position after each record is obtained.

17. A demand apparatus comprising in combination an electric meter, a movable element, a substantially constant speed driving mechanism operatively arranged to move said element, means for interrupting the operative arrangement of said driving mechanism and said element at predetermined equal intervals of metered energy, means tending to return said element to an initial position when the operative arrangement of the driving mechanism and the element is interrupted, and means whereby the extent of movement of said element is recorded at the end of each equal interval of metered energy.

18. A demand instrument comprising a movable element, a driving mechanism operatively arranged to move said element, a stationary record sheet arranged in the path of movement of said element, means for interrupting the operative arrangement of said driving mechanism and said element at predetermined intervals, and means for recording on said record sheet the position of said element each time the operative arrangement of said element and said driving mechanism is interrupted and for returning said element to an initial position after its position has been recorded.

19. A demand instrument comprising a movable element, means tending to return said element to an initial position, an actuator arranged to move said element, means tending to return said actuator to an initial position, a record sheet arranged in the path of travel of said element, a driving mechanism arranged to operatively engage with said actuator, and means for interrupting at predetermined intervals the operative engagement of said driving mechanism with said actuator and for recording on said record sheet the position of said element.

20. A demand apparatus comprising in combination an electric meter, a time actuated driving means, an actuator driven by said means, an element driven by said actuator and adapted to sweep across a suitable record sheet, means for recording on said record sheet the position of said element and for disconnecting said actuator from said driving means at equal intervals of metered energy, and means for returning said actuator and said element to their respective initial positions at such intervals.

21. A demand apparatus comprising in combination an electric meter, a substantially constant speed driving mechanism, an actuator adapted to be driven by said mechanism, means tending to return said actuator to an initial position, an element driven by said actuator and adapted to sweep across a suitable record sheet, means tending to return said element to an initial position, and means actuated by said meter at equal intervals of metered energy for recording the position of said element on said record sheet and for disconnecting said actuator from operation engagement with said mechanism.

22. A demand apparatus comprising in combination an electric meter, an electromagnet having an armature, a pivoted framework adapted to be rocked by said armature, a lever adapted to be rocked by said armature, an actuator carried by said lever, a substantially constant speed driving mechanism, means for holding said actuator normally in operative relation with said mechanism, an element adapted to be driven by said actuator across a suitable record sheet, a pin point on said element adapted to impress a prick mark on said record sheet by the rocking of said framework, and means for energizing said electromagnet at equal intervals of metered energy.

23. A demand apparatus comprising in combination an electric meter, an electric circuit, a contact circuit closer in said circuit, an electromagnet in said circuit, a substantially constant speed driving mechanism, an actuator adapted to be driven by said mechanism, means tending to return said actuator to an initial position, an element adapted to be driven by said actuator, means tending to return said element to an initial position, a record sheet coöperating with said element, means for recording on said record sheet the position of said element and for disconnecting said actuator from operative engagement with said mechanism when said magnet is energized, and means controlled by said meter for operating said circuit closer.

24. A demand apparatus comprising in combination an electric meter, an electric circuit, a substantially constant speed driving mechanism, a pinion driven by said mechanism, a gear adapted to mesh with said pinion, a spring tending to return said gear to an initial position, an element adapted to be driven by said gear, a spring tending to return said element to an initial position, a record sheet coöperating with said element, a pin point on said element adapted to impress a prick mark on said record sheet, an electromagnet in said circuit, means actuated by said electromagnet for forcing said pin point into said record sheet and for disengaging said gear from said pinion, and means controlled by said meter for changing the electrical characteristics of said circuit at equal intervals of metered energy.

25. A demand apparatus comprising in combination an electric meter, an electric circuit, an electromagnet in said circuit, an armature for said electromagnet, a pivoted framework adapted to be rocked by said armature, a lever adapted to be rocked by said framework, an actuator carried by said lever, a spring tending to return said actuator to an initial position, a time actuated driving means, a spring coöperating with said lever and normally holding said actuator in operative relation with said driving means, a movable element driven by said actuator and adapted to sweep across a suitable record sheet, a pin point on said element, means tending to return said element to an initial position, and means controlled by said meter for energizing said magnet at equal intervals of metered energy whereby said framework causes said pin point to prick said record sheet and said actuator is disconnected from engagement with said driving means.

In witness whereof, we have hereunto set our hands this 17th day of March, 1913.

LEWIS T. ROBINSON.
JOHN T. DEMPSTER.

Witnesses:
HELEN ORFORD,
BENJAMIN B. HULL.